July 6, 1948. E. LABIN 2,444,452
OBSTACLE DETECTION AND COMMUNICATING SYSTEM
Filed Dec. 11, 1943 2 Sheets-Sheet 1
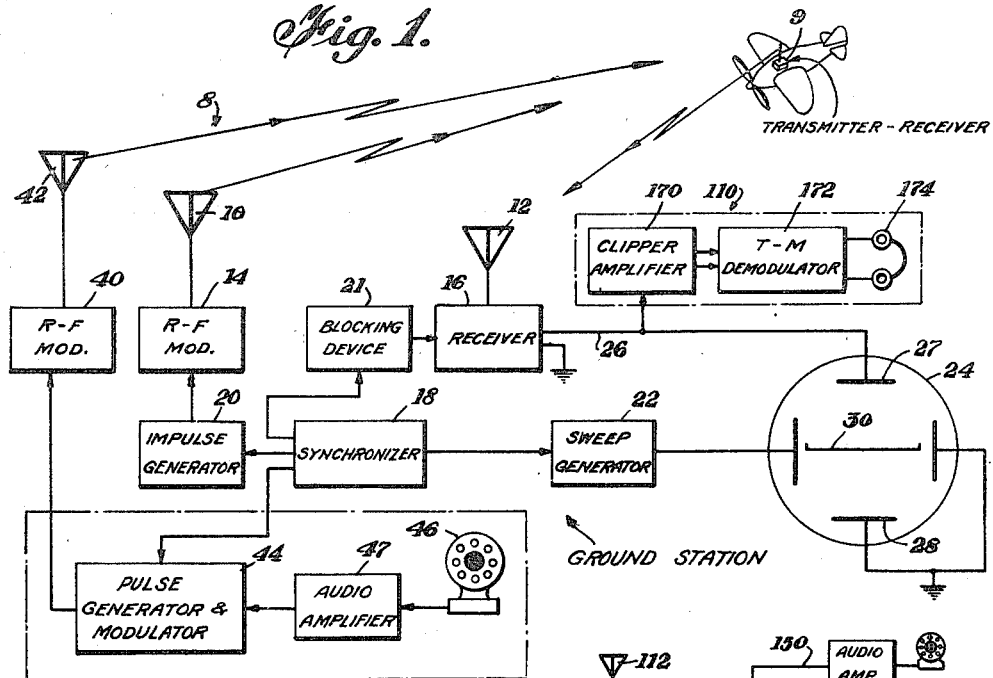
Fig. 1.
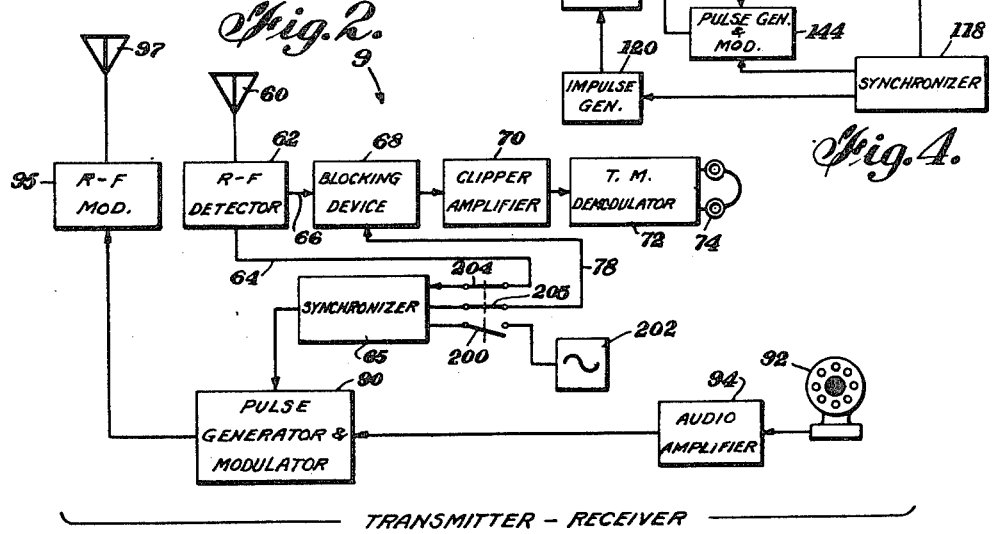
Fig. 2.
Fig. 4.
INVENTOR.
EMILE LABIN
BY
ATTORNEY

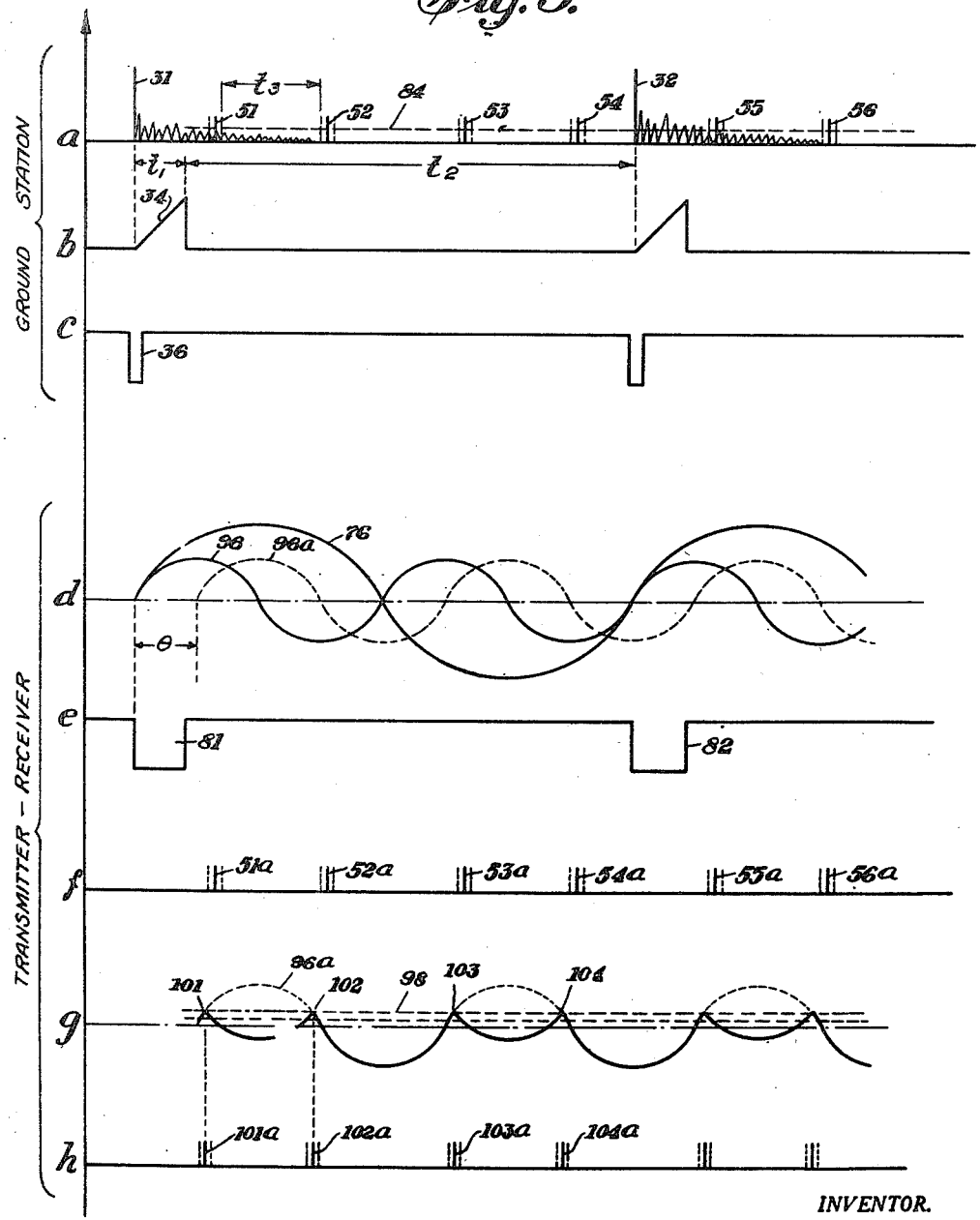

Patented July 6, 1948

2,444,452

UNITED STATES PATENT OFFICE 2,444,452

OBSTACLE DETECTION AND COMMUNICATING SYSTEM

Emile Labin, New York, N. Y., assignor to Federal Telephone and Radio Corporation, New York, N. Y., a corporation of Delaware Application December 11, 1943, Serial No. 513,916

18 Claims. (Cl. 343—13)

This invention relates to radio locating systems for determining the distance and range of obstacles such as aircraft and ships and more particularly to a system of this character by which communication may be had with the occupants of friendly craft particularly for identification purposes.

In the copending joint application of E. Labin-D. D. Grieg-A. M. Levine for "Radio locating and signalling systems," Serial No. 509,230 filed November 6, 1943, a combination radio locating and signalling system is disclosed whereby communication may be held with the occupants of a detected craft without interfering with the detecting function of the system.

It is one of the objects of this invention to provide a further method and means for detecting craft such as airplanes and ships and for communicating with the occupants of the craft.

Another object of the invention is to provide a communicating system readily applicable to most existing radio locating systems with a minimum of alteration.

A further object of the invention is to provide a transmitter-receiver system for use on airplanes, ships, vehicles and at selected stations which is capable of detecting and replying to signals transmitted in conjunction with the transmission of radio detecting impulses.

According to the principles of this invention, the transmitter-receiver circuits of the communicating system are coupled with the radio locating and ranging system and synchronized therewith for transmission and reception of time and/or amplitude modulated pulses timed for occurrence between the periodic intervals of time required for the transmission of impulses and the reception of echo pulses for a given range. The transmitter-receiver circuits with which friendly craft are provided include a synchronizing device responsive only to the high power impulses of the radio locating system wherein the transmitter-receiver system is synchronized to detect and transmit signal pulses of intelligence without interference from the radio detection impulses and without interfering with the detection of echo pulses.

For a better understanding of the invention, reference may be had to the following detailed description to be read in connection with the accompanying drawings, in which:

Fig. 1 is a block diagram of a combination radio locating and signalling system according to the principles of this invention;

Fig. 2 is a block diagram of a transmitter-receiver system for communicating with systems of the character shown in Fig. 1;

Fig. 3 is a graphical illustration useful in explaining the operation of the systems of Fig. 2; and Fig. 4 is a modification of the transmitting portion of the embodiment shown in Fig. 1.

Referring to the system 8 of Fig. 1, the radio locating and ranging equipment of the embodiment therein illustrated is of known character and includes transmitter and receiver antennas 10 and 12, an R. F. modulating oscillator 14 connected to the antenna 10, a receiver 16 connected to the antenna 12, a synchronizer 18, an impulse generator 20 connected to the oscillator 14 for transmission of impulses for obstacle detection and a blocking device 21 for blocking the receiver 16 during the transmission of detection impulses. The synchronizer 18 controls the timing of impulse generation at generator 20 and the blocking voltage produced by the blocking device 21. The synchronizer 18 also controls a sweep generator 22 which provides a sweep voltage for a cathode ray oscillograph 24. The output 26 of the receiver is applied across the deflecting plates 27 and 28 of the oscillograph at right angles to the tracing 30 produced by the cathode ray beam in response to the sweep potential.

The normal operation of the radio locating and ranging system is to transmit recurring impulses and to detect the echo reflections thereof caused by the presence of obstacles such as airplanes or ships and to determine the time intervals between the transmission of an impulse and the reception of echo reflections in response thereto. The range of the system is normally limited to that portion of the time interval between successive impulses which is covered by the tracing 30.

In order to transmit signals of intelligence, without interference with the intervals required for transmission of impulses and the detection of echo pulses for a given range, the recurrence of the impulses is so selected as to provide a time interval between successive impulses greater than that required for the given range. This will be clear from an inspection of curves $a$, $b$, $c$ and $d$ of Fig. 3. Curve $a$ shows two successive impulses 31 and 32. Curve $b$ shows the portion of the time interval between succeeding impulses required for the sweep potential indicated by the saw-tooth 34. This provides a range interval of $t_1$ which is the time required for the cathode ray beam to sweep across the screen of the oscillograph 24. The time interval $t_2$ is the remaining portion of the time interval between successive detection impulses and as shown may be considerably greater than the range interval $t_1$. Curve $c$ shows the timing of the blocking voltage pulses 36 produced by the blocking device 21 and which block the receiver 16 during the transmission of the impulses.

The transmission of signals of intelligence may be performed by the R. F. modulating oscillator 14 and antenna 10, but because of the usual difference in the power required for the detection impulses and the power required for the signal pulses, I show a separate R. F. modulating oscillator 40 and an antenna 42. A pulse generator and modulator 44 of any desired character, whereby pulses are produced and time displaced according to the intelligence to be transmitted, is provided. The signal pulses generated are synchronized with respect to the transmission of detection impulses so that the minimum interval $t_3$ occurrable between successive signal pulses is greater than the range interval $t_1$. While it is preferable to synchronize the signal pulses so none occur during the range interval $t_1$, some may be permitted to occur during the range interval if the interference caused thereby is not great, or where the system includes means for blocking the oscillograph for the duration of such signal pulses.

The signal pulses 51, 52, 53, 54, 55 and 56 shown in curve $a$ are of the "push-pull" type such as produced by the cusper modulator disclosed in the copending application of myself and D. D. Grieg, Serial No. 455,897, filed August 24, 1942 which issued February 25, 1947 as Patent No. 2,416,329. In the absence of modulation, the pulses are, in accordance with the cusper system, biased to an offset condition with respect to a symmetrical timing thereby grouping the pulses in pairs such as pulses 51, 52; 53, 54; and 55, 56. The time modulation of the signal pulses is performed by a "push-pull" operation whereby the pulses of each pair move in opposite directions depending upon the instantaneous polarity and amplitude of the modulating signal.

It will be understood, however, that while I have shown the biased or offset pulse modulating method, that the pulses may have a symmetrical spacing. It will also be understood that the pulses may, instead of being time modulated, be amplitude modulated or both time and amplitude modulated simultaneously, one type of modulation being for one message and the other type of modulation being for a second message.

The transmitter-receiver 9 shown in Fig. 2 comprises a receiving antenna 60 coupled to an R. F. detector 62 which in turn is connected by line 64 to a synchronizer 65. The detector 62 is also connected by line 66 to a blocking device 68 to which is connected a clipper amplifier 70, a T. M. demodulator 72 and earphones 74. The T. M. demodulator may be of any known character capable of translating the time displacement of the signal pulses into amplitude modulated pulses or waves, the intelligence of which is reproduced on the phones 74. A T. M. demodulator of this character is disclosed in the copending application of D. D. Grieg, Serial No. 459,959, filed September 28, 1942 which issued February 25, 1947 as Patent No. 2,416,306.

The synchronizer 65 is arranged for sensitivity to the high power of the detection impulses only, whereby the synchronizer is adapted to tie in synchronously with the timing of the impulses transmitted from the radio locating system as shown in Fig. 1 to which is connected a microphone 46 through amplifier 47. The synchronizer 65 may be of the character which oscillates to produce a sinusoidal wave 76 (curve $d$, Fig. 3) which is of a frequency corresponding to the repetition rate of the impulses 31, 32, etc. This wave is applied over connection 78 to the blocking device 68 to provide blocking pulses 81, 82, etc. (curve $e$, Fig. 3) of suitable width to block passage of energy of impulses 31, 32, etc. and of the echo pulses occurring during the intervals $t_1$ following each of the impulses, to the demodulator 72.

The signal pulses 51—56 are passed by the blocking device since they occur between the blocking pulses 81, 82, etc. and also those echo pulses or other pulses that may occur during the interval $t_2$. The clipper amplifier 70, however, clips the pulses at a level 84 (curve $a$) whereby the echo pulses and other interfering pulses are substantially eliminated. The output of the clipper amplifier 70 is indicated by the pulses $51a$—$56a$ of curve $f$.

To reply from the craft to the ground station, the transmitter-receiver 9 of Fig. 2 includes a pulse generator and modulator 90 which may be the same as the pulse generator and modulator 44 of Fig. 1. The voice signals are received by the microphone 92 and applied to the modulator 90 through an audio amplifier 94. The output of the modulator 90 is applied to an R. F. modulator 95 and radiated over antenna 97.

The modulator 90 is supplied with a sinusoidal wave 96 which, for the present example, is an even harmonic of the wave 76 (curves $d$ and $g$, Fig. 3) shifted in phase as indicated at $96a$ by an amount $\theta$ so as to clear the range interval covered by the sweep voltage for the oscillograph 24. It will be understood, of course, that this difference in the phase as indicated by the shifted position of the wave at $96a$ is dependent on the distance of the craft from the ground station. If the craft is near then a shift substantially equal to the period $t_1$ is desirable, but if the craft is at a considerable distance such as near the perimeter of the range $t_1$ then a shorter shift may be made. This adjustment of the timing of the wave $96a$ may be determined by the distance indicated by a message from the ground station. In this way, the signal pulses may be made to interleave with the range intervals $t_1$ covered by the sweep potentials 34.

The curve $g$ indicates the biased operation of the pulse generator and modulator 90. The pulse producing and modulating generator disclosed in the aforesaid Labin-Grieg application Serial No. 455,897 includes a full-wave rectifier which rectifies each positive and negative portion of the wave $96a$ with respect to an offset axis such as indicated at 98. This produces cusps at 101, 102, 103, 104, etc., which when clipped and shaped produce pulses $101a$, $102a$, $103a$, $104a$, etc. The signal energy operates to displace the axis 98 according to the polarity and amplitude of the signal energy thereby producing a time displacement of the signal pulses, the maximum degree of time displacement being indicated by the broken line on opposite sides of each pulse.

The radio locating and signalling system 8 of Fig. 1 includes a signal detecting circuit 110 which includes a clipper amplifier 170, a T. M. demodulator 172 and earphones 174 similarly as provided in the transmitter-receiver 9 of Fig. 2. The clipper amplifier 170 is connected to the output 26 of the receiver 16 and receives the pulse energy detected by the receiver during unblocked intervals. As hereinbefore described in connection with Fig. 2, the clipper amplifier 170 is arranged to clip the signal pulses and thereby eliminate echo pulses and other disturbances and to pass on the signal pulse energy to the T. M. demodulator which translates the time displacement of the pulses into amplitude modulated wave envelopes for earphones 174.

In Fig. 4, a modified form of the transmitting circuit shown in Fig. 1 is disclosed wherein a single antenna 112 is used with a single R. F. modulating oscillator 114. The modulating oscillator 114 is supplied by impulse energy from generator 120 and signal pulse energy from generator 144. A synchronizer 118 controls the generators 120 and 144 so that the signal pulses of generator 144 do not interfere with the timing of the impulses of generator 120. The intelligence received over microphone 146 is amplified by audio amplifier 147 and applied through switch 148 to the R. F. modulator oscillator 114. The audio amplifier 147 is connected to the synchronizer 118 so as to block the signals during the transmission of detection impulses. The signal pulses transmitted by the oscillator 114, however, are amplitude modulated by the signal energy in the usual manner.

The transmitting circuit of Fig. 4 also includes a second microphone circuit 150 which may be connected by switch 152 for time modulation of the pulses produced at 144. Thus, the system may transmit signal pulses which are modulated in both amplitude and time, the amplitude modulation representing intelligence of one message and the time modulation representing intelligence of another message.

Where the signal pulses are time or amplitude modulated, the clipper amplifiers of the receiver circuits clip the signal pulses so as to preserve the modulation characteristic thereof. Where amplitude modulated pulses are used, the T. M. demodulator circuit, of course, will be by-passed.

From the foregoing, it will be apparent that while the transmitter-receiver of Fig. 2 is useful for detecting and replying to messages from the radio locating system of Fig. 1, it may also be used for signalling to other transmitter-receivers or to the receiving circuit of Fig. 1 when the circuit is not being used for obstacle detection. For this purpose, the synchronizer 65 is provided with an input connection from stable oscillator 202 whereby the synchronizer is controlled. When the oscillator 202 is used, the circuit connections 64 and 78 are preferably opened by switch contacts 204 and 205 which are ganged to the switch contact 200.

While I have described above the principles of my invention in connection with specific apparatus, and particular modifications thereof, it is to be clearly understood that this description is made only by way of example and not as a limitation on the scope of my invention as set forth in the objects of my invention and the accompanying claims.

I claim:

1. A method of detecting at a given point the presence of craft such as airplanes and ships and for signalling intelligence from said point, comprising transmitting a train of impulses, detecting the echo pulses caused by the presence of a craft within a given range corresponding to a given part of the time interval between successive impulses, and signalling by transmitting signals of intelligence synchronized to interleave with said impulses.

2. The method defined in claim 1 wherein the transmitting of the signals includes generating a train of pulses the minimum spacing between successive pulses thereof being not less than said given part of said time interval.

3. The method defined in claim 1 wherein the transmitting of the signals includes generating pulses for occurrence during the remaining portion of said time interval and time modulating said pulses with the intelligence to be transmitted.

4. The method defined in claim 1 wherein the transmitting of the signals includes generating pulses for occurrence during the remaining portion of said time interval and amplitude modulating said pulses with the intelligence to be transmitted.

5. The method defined in claim 1 wherein the transmitting of the signals includes generating pulses for occurrence during the remaining portion of said time interval, time modulating said pulses with intelligence of one message, and amplitude modulating said pulses with intelligence of another message for transmission simultaneously with said one message.

6. A method of detecting the presence of craft such as airplanes and ships and for signalling the occupants of a detected craft, comprising, at a given station, transmitting a train of impulses, detecting the echo pulses caused by the presence of a chaft within a given range corresponding to a given part of the time interval between successive impulses, signalling the occupants of a detected craft by transmitting signals of intelligence synchronized to occur during the remaining portion only of said time interval; and at said craft, detecting the transmitted impulses and signals, and transmitting in return signals of intelligence synchronized to the timing of said impulses.

7. The method defined in claim 6 including further, at said station, the steps of detecting the signals transmitted from said craft, clipping the signals to eliminate echo pulses and noise interference, and demodulating the detected signals to obtain the intelligence thereof.

8. A system for detecting at a given point the presence of craft such as airplanes and ships and for signalling intelligence from said given point, comprising means for transmitting a train of impulses, means for detecting the echo pulses caused by the presence of a craft within a given range corresponding to a given part of the time interval between successive impulses, and means for transmitting signals of intelligence synchronized to interleave with said impulses.

9. The system defined in claim 8 wherein the means for transmitting signals of intelligence includes means for generating a train of pulses with the minimum spacing between the successive pulses thereof not less than said given part of said time interval.

10. The system defined in claim 8 wherein the means for transmitting signals of intelligence includes means for generating pulses for occurrence during the remaining portion of said time interval and means for time modulating said pulses with the intelligence to be transmitted.

11. The system defined in claim 8 wherein the means for transmitting signals of intelligence includes means for generating pulses for occurrence during the remaining portion of said time interval and means for amplitude modulating said pulses with the intelligence to be transmitted.

12. The system defined in claim 8 wherein the means for transmitting the signals includes means for generating pulses for occurrence during the remaining portion of said time interval, means for time modulating said pulses and means for amplitude modulating said pulses whereby two different messages are transmitted simultaneously.

13. A system for detecting the presence of craft such as airplanes and ships and for signalling the occupants of a detected craft, comprising, at said given station, means for transmitting a train of impulses, means for detecting the echo pulses caused by the presence of a craft within a given range corresponding to a given part of the time interval between successive impulses and means for transmitting signals of intelligence synchronized to occur during the remaining portion only of said time interval whereby the occupants of a detected craft may be signalled without interference to the detecting operation of the system; and at said craft, means for detecting the transmitted impulses, means for transmitting signal pulses synchronized to the timing of said impulses and means for modulating a characteristic of said signal pulses with intelligence.

14. The system defined in claim 13 further comprising means for clipping the pulse energy detected to segregate substantially said signal pulses from the echo pulses and noise interference and means for demodulating said signal pulses to obtain the intelligence thereof.

15. A combination radio locating and communicating system comprising means for transmitting a train of impulses, means for detecting the echo pulses caused by the presence of a craft, such as an airplane or ship, within a given range corresponding to a given part of the time interval between successive impulses, means for transmitting a train of signal pulses synchronized for occurrence only during the remaining portion of said time interval, and demodulator means coupled with said detecting means for reception of signals in answer to said signal pulses.

16. A combination radio locating and communicating system for transmitting and receiving signals comprising means for transmitting a train of impulses and a train of signal pulses, means for interleaving the signal pulses with the impulses, means for detecting echo pulses caused by the presence of a craft, such as an airplane or ship, together with other signal pulses, and demodulator means coupled with said detecting means for demodulating the intelligence of the detected signal pulses.

17. A transmitter-receiver system for communicating with a system which transmits high power impulses with signal pulses interleaved therewith, comprising means to detect the high power impulses and signal pulses, synchronizer means responsive only to the high power impulses, means for demodulating the signal pulses detected, and means controlled by said synchronizer means for blocking said demodulator means during the reception of said high power impulses.

18. The transmitter-receiver system defined in claim 17 further comprising means for transmitting signals of intelligence, and means under control of said synchronizer means to time the transmission of said signals with respect to said high power impulses.

EMILE LABIN.

REFERENCES CITED

The following references are of record in the file of this patent:

UNITED STATES PATENTS

| Number | Name | Date |
| --- | --- | --- |
| 2,157,122 | Dunmore | May 9, 1939 |
| 2,227,598 | Lyman et al. | Jan. 7, 1941 |
| 2,252,083 | Luck | Aug. 12, 1941 |